Patented Nov. 29, 1949

2,489,309

UNITED STATES PATENT OFFICE 2,489,309

PREPARATION OF AN IRON-FREED ACID-TREATED KAOLIN CATALYST

George Alexander Mills, Ridley Park, and Edward B. Cornelius, Swarthmore, Pa., assignors to Houdry Process Corporation, Wilmington, Del., a corporation of Delaware No Drawing. Application April 30, 1946,
Serial No. 666,179

14 Claims. (Cl. 252—450)

The present invention relates to the preparation of adsorptive contact masses from natural argillaceous materials and is chiefly concerned with the production of contact masses useful as catalysts particularly in hydrocarbon conversion.

Natural products having chiefly the chemical constitution of aluminum hydrosilicates have been employed in the arts, because of their adsorbent capacities, for decolorizing and clarifying liquids such as petroleum oils. Such materials as fuller's earth and certain bentonite clays find extensive use for this purpose particularly after activation in known manner such as by means of preliminary acid treatment. Adsorbent contact masses comprising gels of silica and alumina in intimate association have also been produced by synthetic methods involving precipitation or coprecipitation of these materials. Such synthetic contact masses as well as acid-activated clays having substantial cracking activity are extensively employed as catalysts in hydrocarbon conversion processes and, in fact, these constitute the principal materials for the purpose in current commercial operations.

There are certain readily available and cheap clays, including for instance those which contain kaolinite as the characteristic clay mineral constituent, which do not respond to acid treatment to produce adsorbents having bleaching or decolorizing properties of desired high activity levels, and although such clays may exhibit catalytic activity sufficient to warrant interest, they have not entered into significant commercial use in hydrocarbon cracking because their cracking activities are comparatively low and/or they also tend to produce disproportionate quantities of coky deposit compared to the yield of desired cracked liquid products including gasoline.

The value of a contact mass in catalytic cracking of hydrocarbon materials depends to a large extent upon its selectivity in producing from a charge stock high or acceptable yields of desired liquid products such as motor fuels with relatively low production of by-product gas and coke, particularly the latter. Although gaseous by-products can be usefully employed as charge to polymerization, alkylation or other processes, it is nevertheless generally preferable to employ catalysts having an inherent tendency to produce high ratios of normally liquid to gaseous products, since, even with such catalysts higher yields of gaseous products can be obtained, if desired, by the control of the severity of cracking conditions. The coky deposit formed in a cracking operation, however, represents loss of charge to products that are not essentially recoverable, and the reduction of the quantity of this product even as to small changes in ratio of coke produced to gasoline yield are highly significant in the consideration of the economics of commercial operation.

The inherent catalytic properties of a catalyst with respect to comparative coke and gas making tendencies as well as its ability to produce cracked liquid products are determinable by test carried out under standardized conditions. One such test in current use is that known as the "CAT—A" method, described in "Laboratory Method for Determining the Activity of Cracking Catalysts" by J. Alexander and H. G. Shimp, page R-537, National Petroleum News, August 2, 1944. In accordance with that method, a light gas oil is subjected to contact with the catalyst under fixed cracking conditions and the activity index of the catalyst is expressed in terms of volume per cent of obtained gasoline; the weight per cent of wet gas, specific gravity of the wet gas, and the weight per cent of carbonaceous deposit are also determined. Notations of catalyst activity in the present specification have reference to that determined by the above test.

Although acid-activated bentonite clays of high cracking activity as well as synthetic silica-alumina gels are currently employed in commercial processes of hydrocarbon conversion, these synthetic catalysts offer advantages from the standpoint of higher ratios of gasoline formed to coke deposited, superior stability particularly in use with stocks causing abnormal loss of catalytic activity, and better performance characteristics in the motor fuel produced.

Raw clays ordinarily contain in addition to the principal compounds and complexes of silica and alumina lesser proportions of compounds of iron, calcium, magnesium, etc. Some clays also include among their lesser components, compounds of zirconium and titanium. In the conventional treatment of adsorbent clays with acid to activate the same, a portion of these minor metal compounds is removed along with portions of the aluminum content, but such treatment as conventionally practiced results in masses still containing fairly large percentages of iron, giving rise to certain disadvantages in contact masses formed therefrom particularly when used as catalysts in hydrocarbon cracking operations.

It has now been found that improved contact masses of low or reduced content of iron compounds and other fluxing contaminants and demonstrating generally the desirable characteristics of synthetic catalysts comprising silica and alumina can be prepared from clays. The improved contact masses are prepared in accordance with the present invention by extracting the clay with acid to an extent at least sufficient to dissolve a substantial portion of the aluminum with portions of the iron or other metal contents of the clay, recovering from the acid liquor an aluminum product substantially free from iron or other undesired metal contaminants, which purified aluminum product is reincorporated with the residual clay mass.

To enhance the effect of the acid in the dissolution of aluminum as well as iron from the clay it is often advantageous to first calcine the raw clay, which may be done at temperatures of from about 300° F. and upwards, but below the temperature at which the clay is caused to sinter or shrink rapidly, which for most clays generally takes place at temperatures above about 1500–1600° F.

Instead of calcining the raw clay with air, other gases or vapors may be employed, particularly reactive gases which affect the freeing of iron compounds from the clay. For instance the raw clay may be treated with hydrogen sulfide or carbon disulfide at elevated temperature of about 300° F. to about 1600° F. to convert the iron present therein to iron sulfides which may then be more readily extracted by the subsequent acid treatment. In copending U. S. applications filed January 30, 1946, Serial Numbers 644,421, now U. S. 2,466,046, and 644,422, now U. S. 2,466,047, and 644,423, now U. S. 2,466,048, there are disclosed certain novel methods of treating raw or acid-treated clay with reactive gases, which may be followed by acid leaching to obtain improved contact masses from which a portion of the iron is thereby removed. The present invention is accordingly also applicable to clays which have been treated with reactive gases or vapors as disclosed in these applications.

If the raw clay subjected to the gas or vapor treatment or air calcination as above described is in the form of coarse particles or more regular agglomerated pieces, the same may be subjected to acid treatment while retaining the same form, or if desired may then be further comminuted. The raw or pretreated clay in any case is then subjected to acid treatment to dissolve aluminum compounds along with iron compounds and other contaminants, the acid liquor purified and the aluminum reprecipitated on the clay residue. Carrying out the acid treatment on preformed clay pieces offers the convenience of easy separation of the clay residue from the acid liquor for ready purification of the liquor. On the other hand, the contact masses may be used in finely divided condition so that formation of aggregates is not essential, or if desired, the forming step may be deferred until the acid leached clay residue has been reincorporated with the aluminum precipitated from the acid liquor. The procedure according to the latter embodiment also has advantages from the operation standpoint. Thus, the finely divided clay after acid treatment and water washing can be added as a continuous stream to the purified acid liquor and the precipitating agent for the aluminum injected continuously into the stream to form the composite. Alternatively, the purified acid liquor and precipitant solution or suspension may be injected into a slurry or stream of clay suspension. The precipitation of the aluminum compound in the presence of the clay suspension in accordance with these embodiments can be employed to advantage with the type of continuous mixer and extruding head described in U. S. Patent 2,370,200, issued to Hubert A. Shabaker, February 27, 1945.

The extent of the acid treatment of the clay governed by such factors as concentration, time and temperature, may be varied over a wide range but should be sufficient at least to extract substantial quantities of alumina. As the acid treatment of a clay is progressively extended as measured by the quantity of alumina removed from the clay, the catalytic cracking activity of the clay is enhanced until a point of maximum or optimum activity of the clay residue is reached, beyond which, no further improvement in activity characteristics is obtained on continued acid treatment, and in fact, the activity of the clay residue may decline on further acid treatment. The extent of acid treatment in accordance with the present invention, however, is not limited by these considerations of the activity of the obtained clay residue, since the activity of the acid treated clay residue does not necessarily determine the activity of the finished catalyst containing the redeposited alumina. Catalysts showing substantial improvement in activity over the original or acid treated clay are obtained by the described procedure whether the acid treatment is carried out short of, up to or considerably beyond that which produces optimum cracking activity of the clay residue alone. Composite catalysts having improved gasoline/coke ratios are already obtained with a mild acid treatment removing as little as 1% of the aluminum content of the clay. Catalysts of high activity levels may be obtained even from clays having a high content of alumina, by the removal and redeposition of 90% or more of the original aluminum content. It accordingly appears that the invention is not limited to any particular extent of the acid treatment and includes treatments effecting substantially complete extraction of the alumina. As a general rule with most clays excellent composites are obtained when the acid treatment is carried out to remove more than 5% and up to about 80% of the original aluminum content of the raw clay.

The rate at which alumina is extracted from a particular clay by the acid, as will readily be understood, will depend upon the kind of acid used, the dilution of the acid, the ratio of acid to clay, the temperature of treatment and to a lesser extent upon other operating variables, the treatment being continued for the required time to effect the desired extraction. Acid treatment may be effected by, but is not restricted to methods similar to those employed in known processes for "acid activation" in the manufacture of decolorizing clays. For instance concentrated mineral acid such as hydrochloric or sulfuric may be added to an aqueous suspension of clay or dilute acid may be added directly to the raw or dried clay. In known acid activation the weight ratio of acid to dry clay may be from about 20% to 100% (anhydrous acid basis) and in the present invention even higher ratios may be employed, but ratios in the order of 30 to 60% are preferred. The treatment of the clay with the acid is preferably carried out at elevated temperature as at about 160° F. to about the boiling point of the acid mixture. Although organic acids such as acetic or oxalic may be employed, mineral acid is preferred particularly if it is desired to remove relatively large quantities of alumina from the clay. The clay may be permitted to soak in the acid or any known or desired leaching or extracting procedure may be employed. If the clay is washed with water after acid treatment, the wash water may be combined with the acid extract liquor for its content of aluminum compound, or if successive water washes are employed, the filtrates of one or more of the later washes may be discarded.

Of course if the acid treat liquor is to be purified by precipitation therefrom of iron or other contaminants, separation of the residual clay solids from the liquor will be required, which may be accomplished in any known or desired manner including filtration or decantation. Such separation will not always be necessary, as hereinafter pointed out, so that the precipitant for the aluminum compound may be added directly to the mixture of clay and acid with suitable agitation to obtain uniformity of reaction. As precipitant for the aluminum compound any reagent may be employed which will form an insoluble aluminum compound for example a gelatinous precipitate or gel, for instance alkali metal or ammonium hydroxide or strong organic bases such as amines or quaternary bases such as trimethyl benzyl ammonium hydroxide. Other reagents that may be employed include soluble phosphates, or silicates which form under appropriate controlled pH conditions gelatinous or other precipitates comprising aluminum hydrosilicate or gel complexes including silica and aluminum compounds such as alumina, which compounds or composites preferably have catalytic activity. In order to effect faster setting of the gel or precipitate appropriate agents may be added including acid or alkaline substances to modify the pH of the composition. For instance with alkaline silicate as the precipitating agent it is advantageous to control the hydrogen ion concentration to effect a gelation at pH of 5 to 10 or preferably at or above neutrality which can be obtained by the addition of agents such as acids, ammonia and/or ammonium sulfate. The precipitating agent may be another metallic salt, such as a soluble zirconium salt which forms compounds or complexes with alumina.

If the precipitant forms with the aluminum a definite chemical compound, the precipitant may be added in stoichiometric amount or slightly in excess of the estimated or previously determined aluminum content of the acid liquor. On the other hand, reagents forming complexes of varying ratio, may be added in amounts varying over a wide range depending upon the ratios offering optimum or desired activity. Thus in the case of silicate being added, although wide variation is possible, it is preferred to employ an amount furnishing at least a weight ratio of $SiO_2/Al_2O_3$ in the precipitate of 60/40, irrespective of the $SiO_2/Al_2O_3$ ratios of the original raw clay or the acid treated clay residue. Proportions of silicate giving a ratio of $SiO_2/Al_2O_3$ in excess of about 95/5 result in little or no improvement in activity of the acid treated clay.

The purification of the acid liquor to remove iron or other impurities may be accomplished by treating the same with reagents selectively forming insoluble iron compounds without substantial precipitation of aluminum compounds, for example sodium hydroxide or potassium ferrocyanide, and the iron may be recovered as a valuable reaction product. In using sodium hydroxide as reagent, the precipitate will also contain quantities of calcium hydroxide and magnesium hydroxide. Instead of precipitating the iron, selective removal may be effected by precipitation of the aluminum, retaining the iron in solution as a soluble complex. Separation may alternatively be effected by selective partitioning liquids such as by treatment with ether and hydrochloric acid or ether and an alkali metal thiocyanate whereby the formed iron compound is extracted in the ether layer. In fact any method selectively separating iron and aluminum compounds may be employed including fractional or selective crystallization as for instance in the case of ammonium sulfate as reagent taking advantage of the difference in solubility of the formed alums.

Instead of removing the iron from the acid liquor, the unpurified acid liquor may be treated to precipitate the aluminum in the gel occluding the iron in a form that can readily be washed or dissolved out of the gel. Thus the acid liquor may be treated with alkali metal silicate under alkaline conditions to form a silica-alumina gel in the presence of the clay and the gel or composite treated with a soluble cyanide to convert the iron to soluble ferrocyanide which can be washed from the gel. Following this procedure, previous separation of the clay residue from the acid treat liquor will not be required. Likewise, where the iron is removed from the acid liquor electrolytically as by deposition on a mercury electrode, separation of the acid liquor and clay residue will not be necessary.

The composite of clay and aluminum precipitate or gel obtained in accordance with any of the methods above described may be made into a catalyst or other contact mass and finished in any known or desired manner which may include in any order of sequence washing, drying and forming into desired shapes and sizes. If the composite contains alkali metal in soluble or exchangeable form the same may be removed by washing the composite preferably after drying, with acidic solutions or solutions of ammonium salts. Other metal salts or oxides may be incorporated into the composite by adsorption or ion exchange including for example those of zirconium, beryllium, chromium, or further quantities of alumina or other aluminum compounds in addition to that derived from the acid liquor. If desired, a portion of the purified acid treat liquor containing aluminum salts may be reserved and employed as a base exchange agent at this stage.

For catalyst use the composite should be finally calcined at a temperature above 500° F. in air or steam or in mixtures of the same, although, if desired, the calcination step may be effected in the use of the catalyst incident to the high temperatures encountered in hydrocarbon conversion processes and regeneration of the catalyst.

Agglomerated masses or pieces of the composite contact mass may be formed by suitably breaking up a dried filter cake or more regular sizes and shapes may be obtained by dry tableting or by molding including casting or extruding of the wet or wetted comminuted material. If desired, the clay residue in finely divided form may be incorporated with a hydrosol formed from the aluminum in the acid extract liquor and the composite set as droplets in a static or turbulent water immiscible liquid to produce contact masses of the "bead" type.

The contact masses prepared in accordance with the present invention find use generally where absorbent clays or dried gels comprising silica-alumina have been employed. As catalysts in hydrocarbon conversion processes these products can be beneficially and profitably substituted in processes employing clay or synthetic silica-alumina, including such processes as dehydration of hydroxy compounds as well as cracking, reforming, polymerizing and desulfurizing of hydrocarbons and hydrocarbon oils. Inactive clays, such as kaolins, when treated in accordance with the present invention, become available for beneficial use as catalysts such as in the processes above-named as well as decolorizing, adsorbing and filtering materials for gases and liquids as for instance in decolorizing oils and in adsorption of gasoline or other volatile hydrocarbons from natural gas. As a result of the lowered iron content, catalysts prepared by the described methods demonstrate excellent stability and superior resistance to abnormal aging by sulfur-containing or other corrosive petroleum stocks. The new catalysts also produce comparatively low coke, wherefore they are additionally of special advantage for cracking heavy petroleum stocks.

The use of contact masses prepared in accordance with the present invention as catalysts in processes for converting hydrocarbons is more particularly described and claimed in our co-pending application Serial No. 666,180, filed April 30, 1946.

Example I

A raw kaolin clay from Putnam County, Florida, known commercially as "Edgar EPK" was treated with 20% HCl for one hour on a steam bath using 8.8 parts by weight of the dilute acid to 4 parts of clay. The extract obtained was separated by filtration and treated with strong caustic soda to yield a precipitate comprising chiefly iron compounds which were removed. A portion of the iron freed filtrate was reacidified and combined with acid extracts obtained on repeated acid treatment of part of the original clay residue over a period of several days until the residue was reduced to an $Al_2O_3$ content corresponding to about 82 $SiO_2$: 18 $Al_2O_3$. The combined extracts were adjusted to pH 3.0 with $NH_4OH$.

The resulting clay residue was slurried with the above acid liquor and the slurry added to diluted sodium silicate solution ("N-Brand") in proportions giving 187 parts of $SiO_2$ in the silicate solution to 30.5 parts of $Al_2O_3$ in the acid liquor. Partial gelation occurred and was completed by the addition to the mix of dilute $NH_4Cl$ and concentrated $NH_4OH$ solutions to bring the mix to a pH of 7.9.

The obtained composite was broken up and dried in an oven overnight and the dried gel base exchanged with 10% ammonium chloride solution to remove zeolitically held salts and washed with water a number of times until chloride free, and the washed gel oven dried overnight at 212° F. The obtained dried mass was then ground in a ball mill with addition of water and cast into pellets which were then oven dried at 200° F.

The pellets were calcined at 1400° F. for ten hours in the presence of 5% steam and then tested for catalytic activity in the cracking of a light gas oil by the "CAT-A" method. There was obtained a yield of 45.1% by volume of gasoline based on the volume of oil charged, with the production of 3.1% by weight of coke and 8.6% by weight of gas of 1.61 specific gravity.

The raw clay employed in this example had the following analysis by weight on a dry (105° C.) sand-free basis:

| | Per cent |
|---|---|
| Ignition loss | 12.9 |
| $SiO_2$ | 46.6 |
| $Al_2O_3$ | 38.8 |
| $Fe_2O_3$ | 1.0 |
| CaO | 0.44 |
| MgO | 0.23 |
| $TiO_2$ | 0.35 |
| Alk. metal (as oxides) | 0.52 |

The calculated proportions of acid treated clay residue to synthetic gel was 20/80, the gel containing approximately 86% $SiO_2$/14% $Al_2O_3$.

Another portion of the iron-freed filtrate obtained above was composited with part of the clay residue from acid treatment at that stage (containing 55 $SiO_2$/45 $Al_2O_3$), in the presence of sodium silicate solution giving 98 $SiO_2$/2 $Al_2O_3$ with the aluminum content of the acid liquor. Treated, washed, and purified as above, the composite was similarly pelleted and calcined. The pellets similarly used in the cracking of a light gas oil, produced 29.5% by volume of gasoline, with 1% by weight of coke and 3.7% by weight of gas of 1.37 specific gravity.

Example II 1020 parts of the raw kaolin of Example I were acid treated with 20% HCl acid solution (.40 anhydrous acid to dry clay basis) by stirring for 4 hours at 93° C. The slurry was filtered and the filtrate freed of iron by treatment with $K_4Fe(CN)_6$. A portion of the filter cake washed chloride free was slurried in a portion of the partly neutralized iron free filtrate and the slurry added with stirring to a dilute sodium silicate solution (96 parts $SiO_2$ from the silicate to 17 parts $Al_2O_3$ in the liquor). Gelation was completed with the addition of concentrated $NH_4OH$ which brought the mixture to an approximate pH of 9.0.

The obtained gel material was treated in the usual manner which included filtration, base exchange of zeolytically held materials with $NH_4+$ and final washings. The washed material was oven dried and then mixed with water and extruded to form pellets which were dried and calcined as in the preceding example. There was obtained on cracking of a light gas oil under the standard test conditions 35.2% by volume of gasoline with 1.5% by weight of coke and 5.1% by weight of gas of 1.44 specific gravity.

Example III

Eight parts by weight of a dry ground bentonite clay from Montgomery County, Alabama, heated to 150° F. were added, slowly enough to maintain the 200° F. temperature of acid solution, to a sulfuric acid solution containing 4.15 parts of concentrated $H_2SO_4$ (96.5%) and 27.8 parts of water. During the twelve hour treat approximately 8 parts of water were added to the agitated (by hot air) mixture to maintain the liquid level. After cooling for one and one-half hours, the material was filtered and washed, batchwise, with 16 parts of water each time for six times.

A portion of the acid filtrate combined with wash water liquor was treated with strong caustic solution at 85° C. for 30 to 45 minutes. The precipitate formed, which was composed chiefly of iron compounds, was removed by filtration.

A portion of the iron-freed filtrate containing .57 part of $Al_2O_3$ were combined with 12.5 parts of the clay filter cake described in the first paragraph above. To this slurry was added a sodium silicate solution (14.5 parts "N-Brand") containing 4.15 parts of SiO₂. The addition to this stirred mixture of 131 parts of a 1.141 sp. gr. solution of (NH₄)₂SO₄ caused gelation at a pH of 9.5.

This gelatinous material was filtered and fast dried at 240° F. for 2½ hours. The dried material was then washed ten times with water, treated four times with NH₄Cl solution and washed chloride free. The washed material was oven dried, ground for 3 hours and then mixed for 45 minutes with about an equal quantity by weight of water, cast into pellets and dried.

The raw bentonite clay employed in this example had the following analysis by weight on a dry (105° C.) basis:

|  | Per cent |
|---|---|
| Ignition loss | 8.21 |
| SiO₂ | 60.9 |
| Al₂O₃ | 19.3 |
| Fe₂O₃ | 4.52 |
| Na₂O | 0.13 |
| CuO | 0.0013 |
| CaO | 1.65 |
| MgO | 4.87 |

The ratio of SiO₂:Al₂O₃ in the acid treated clay residue was about 81/19. There was present in the composite 66 parts of clay to 34 parts of synthetic silica-alumina gel formed, the synthetic having a ratio of 87.5 SiO₂:12.5 Al₂O₃.

The pellets above obtained calcined and used in cracking of a gas oil as in the preceding examples gave the following yields: 35% by volume gasoline, 1.8% by weight of coke and 4.1% by weight of gas of 1.47 specific gravity.

Example IV

The raw kaolin clay described in Example I was treated with 20% sulfuric acid (.6 part by weight of acid to clay on anhydrous basis) for 8 hours at 93° C. The acid extract thus obtained was separated from the residual clay solids and treated with potassium ferrocyanide in sufficient amount to precipitate the iron present, care being taken to avoid a solubilizing excess of the ferrocyanide reagent. The precipitate composed principally of iron compound was then filtered off.

A portion of the iron free liquor containing 4.3 parts of Al₂O₃ was added to 154 parts of the above clay residue washed free of SO₄ ions and these mixed to form a slurry. To the slurry diluted with more than an equal volume of water there was added 105 parts of sodium silicate ("N-Brand"), furnishing 30 parts of SiO₂, likewise diluted with water, and then 633 parts by weight of ammonium sulfate solution (1.092 specific gravity). A gel was thereby formed having a pH of 9.4, which comprised the calculated proportions of 87.5% SiO₂/12.5% Al₂O₃, not considering the content of these constituents in the clay residue.

The composite of clay residue and gel was washed and base exchanged with NH₄+, dried and cast into pellets similarly to the products of the preceding examples. Analysis of the pellets gave .30% TiO₂ and 0.57% Fe₂O₃.

The pellets were calcined and tested for cracking activity as in Example I. There was obtained 39.1% by volume of gasoline, 1.8% by weight of coke and 5.8% by weight of gas of 1.53 specific gravity.

By acid treating clays having an iron content corresponding to 1% or more Fe₂O₃, catalyst composites having less than 0.6% Fe₂O₃ can be readily obtained by the described methods. By the use of more severe acid treatment as described, or by the selection of raw or modified clays of initial iron content of less than 1% or of clays treated to make the iron more available, composites having less than 0.4% and even less than 0.2% Fe₂O₃ may be obtained.

Instead of the particular brand of alkali metal silicate specifically referred to in the above examples, other soluble silicates may be employed as precipitant for the alumina, such as a solution of sodium metasilicate (Na₂SiO₃.5H₂O), the quantity employed being of course modified appropriately in accordance with the silica content of the particular reagent selected.

The invention is not limited to the coprecipitation of the silica-alumina as described in the specific examples, since either of the components may be separately adsorbed on the clay residue or separately precipitated and incorporated with the clay residue followed by the other. For instance, for composites comprising silica-alumina, the clay residue containing aluminum salts adsorbed from the acid liquor may be treated with an alkali metal silicate, or the aluminum salt on the clay residue may be first treated to form alumina and the silica then incorporated therewith for instance by hydrolysis of a silicon compound such as an alkyl silicate. Alternatively, the separated clay residue may be first treated to deposit or incorporate silica or a soluble silicate and then brought together with the acid treat liquor furnishing the alumina. Or a composite of clay residue and alumina, with or without silica, may be treated to incorporate other metal compounds such as oxides by adsorption or base exchange, or the additional metal compound, for example, a zirconium salt, may be employed as a precipitant for the aluminum in the acid liquor or on the clay residue.

Obviously many modifications and variations of the invention as hereinbefore set forth may be made without departing from the spirit and scope thereof and therefore only such limitations should be imposed as are indicated in the appended claims.

We claim as our invention:

1. Process of forming adsorbent contact masses from clay containing aluminum and iron compounds which comprises extracting the clay with acid to an extent at least sufficient to dissolve a substantial quantity of the aluminum content of the clay thereby forming a clay residue of less than original iron content containing undissolved aluminum compounds and an acid extract containing dissolved aluminum as a salt of the acid employed, subjecting the acid extract to purification effecting the removal of iron compounds therefrom and precipitating an aluminum compound from the purified acid extract in the presence of the clay residue to thereby deposit the said aluminum compound onto said clay residue.

2. Process of forming adsorbent contact masses from clay containing aluminum compounds which comprises treating finely divided clay with an acid to an extent at least sufficient to dissolve a substantial quantity of the aluminum content of the clay thereby forming an acid extract of the clay containing aluminum salts dissolved therein, separating the extract from the obtained clay residue containing undissolved aluminum compounds, purifying the extract to remove iron compounds, recombining the purified extract with the clay residue to form a slurry and adding an alkali metal silicate to the slurry.

3. Process of forming adsorbent contact masses from clay containing aluminum compounds which comprises treating finely divided clay with an acid to an extent at least sufficient to dissolve a substantial quantity of the aluminum content of the clay thereby forming an acid extract containing aluminum salts dissolved therein, separating the extract from the obtained clay residue containing undissolved aluminum compounds, treating the separated extract with a reagent forming insoluble iron compounds, removing from the extract the insoluble iron compounds so formed to purify the extract, recombining the purified extract with the clay residue to form a slurry, precipitating an aluminum compound onto the finely divided clay in the slurry by addition to the slurry of an alkali metal silicate in the presence of agents modifying the pH of the slurry.

4. Process of forming adsorbent contact masses from clay containing aluminum compounds which comprises treating finely divided clay with an acid to an extent at least sufficient to dissolve a substantial quantity of the aluminum content of the clay thereby forming an acid extract containing aluminum salts dissolved therein, separating the extract from the obtained clay residue containing undissolved aluminum compounds, treating the separated extract with a reagent forming insoluble iron compounds, removing from the extract the insoluble iron compounds so formed to purify the extract, recombining the purified extract with the clay residue to form a slurry, and precipitating an aluminum compound onto the finely divided clay in the slurry by addition to the slurry of an alkali metal silicate in the presence of alkaline hydroxide.

5. Process of forming adsorbent contact masses from clay containing aluminum compounds which comprises extracting the clay with acid to an extent at least sufficient to dissolve a substantial quantity of the aluminum content of the clay thereby forming an acid extract containing aluminum as a salt of the acid employed and also containing iron salt, separating the acid extract from the obtained solid clay residue containing undissolved aluminum compounds, treating the separated acid extract with sodium hydroxide to precipitate iron compounds therefrom, separating the precipitated iron compounds, and redepositing on the above acid treated clay residue an aluminum compound formed from the iron-freed acid extract.

6. Process of forming adsorbent contact masses from clay containing aluminum compounds which comprises extracting the clay with mineral acid to an extent at least sufficient to dissolve a substantial quantity of the aluminum content of the clay thereby forming an acid extract containing aluminum as a salt of the acid employed and also containing iron salt, separating the acid extract from the obtained solid clay residue containing undissolved aluminum compounds, treating the separated acid extract with a soluble ferro cyanide compound to precipitate iron compounds therefrom, separating the precipitated iron compounds, and redepositing on the above acid treated clay residue an aluminum compound formed from the iron freed acid extract.

7. Process of forming adsorbent contact masses from clay containing aluminum compounds which comprises extracting the clay with mineral acid to an extent at least sufficient to dissolve a substantial quantity of the aluminum content of the clay thereby forming an acid extract containing aluminum as a salt of the acid employed and also containing iron salt, separating the acid extract from the obtained solid clay residue containing undissolved aluminum compounds, treating the separated acid extract with a soluble ferro cyanide compound to precipitate iron compounds therefrom, separating the precipitated iron compounds, and redepositing on the above acid treated clay residue a gel comprising silica-alumina derived by treating the above iron-freed acid extract with a soluble silicate.

8. Process of forming adsorbent contact masses from clay containing aluminum compounds which comprises treating finely divided clay with an acid to an extent at least sufficient to dissolve a substantial quantity of the aluminum content of the clay thereby forming an acid extract containing aluminum salts dissolved therein, separating the extract from the obtained clay residue containing undissolved aluminum compounds, treating the separated extract with a reagent forming insoluble iron compounds, removing from the extract the insoluble iron compounds so formed to purify the extract, recombining the purified extract with the clay residue to form a slurry, adding an alkaline silicate to the slurry to form a composite of the clay residue and silica-alumina, drying the composite thus obtained, treating the dried composite with an ammonium salt solution to free the same of alkali metal ions, and forming the composite into aggregates.

9. The process of forming adsorbent contact masses from kaolin containing aluminum compounds which comprises calcining preformed masses of raw kaolin, extracting a substantial quantity of the aluminum content of the kaolin by treatment with an acid to provide a kaolin residue retaining a portion of its original aluminum content, purifying the extract thus obtained to remove iron compounds, and recombining the aluminum in modified form with the resulting kaolin residue by precipitation of the aluminum content of the acid treat liquor with an alkali metal silicate.

10. Process of forming adsorbent contact masses from kaolin containing aluminum and iron compounds which comprises extracting the kaolin with acid to an extent at least sufficient to dissolve a substantial quantity of the aluminum content of the kaolin thereby forming a kaolin residue containing undissolved alumina and an acid extract containing aluminum as a salt of the acid employed, subjecting the acid extract to purification designed to remove iron impurities, and precipitating an aluminum compound from the purified acid extract in the presence of the above kaolin residue to thereby deposit the said aluminum compound onto said kaolin residue.

11. Process of forming adsorbent contact masses from clay containing aluminum compounds which comprises extracting the clay with acid to an extent at least sufficient to dissolve more than 5% and up to about 80% of the original aluminum content of the clay thereby forming an acid extract containing aluminum as a salt of the acid employed, purifying the obtained acid extract to remove iron compounds therefrom, and compositing the above acid treated clay residue with the silica-alumina product formed by reaction of the purified acid extract and a water soluble silicate.

12. Process of forming adsorbent contact masses from kaolin containing aluminum compounds which comprises treating finely divided kaolin with an acid to an extent at least sufficient to dissolve a substantial quantity of the aluminum content of the kaolin thereby forming an acid slurry of the kaolin containing aluminum salts dissolved therein, purifying the slurry to free the same of iron compounds, adding an alkali metal silicate solution to the purified slurry thereby forming a composite of kaolin and precipitated silica-alumina, drying the composite so obtained, treating the dried product with an ammonium salt solution to free the same of alkali metal ions and forming the composite into aggregates.

13. The process according to claim 12 in which the recited purification of the slurry is accomplished by steps comprising separation of the acid extract liquor from residual clay solids, treatment of the separated liquor with a precipitant for iron compounds, and removal of the iron precipitate thus obtained.

14. Process of forming catalytic adsorbent contact masses from clay containing aluminum compounds which comprises treating finely divided clay with mineral acid to an extent at least sufficient to dissolve a substantial quantity of the aluminum content of the clay thereby forming a clay residue containing undissolved aluminum compounds and an acid extract containing aluminum salts dissolved therein, separating the extract from the clay residue, treating the separated extract with a reagent forming insoluble iron compounds, removing from the extract the insoluble iron compounds so formed to purify the extract, recombining the purified extract with the clay residue to form a slurry and adding to the slurry an alkali metal silicate in a quantity dependent upon the content of aluminum salts dissolved in the slurry, the quantity of alkali metal silicate being at least sufficient to provide a $SiO_2/Al_2O_3$ weight ratio from the added silicate and dissolved aluminum salts in the slurry in the range of 60/40 to 95/5.

GEORGE ALEXANDER MILLS.
EDWARD B. CORNELIUS.

REFERENCES CITED

The following references are of record in the file of this patent:

UNITED STATES PATENTS

| Number | Name | Date |
|---|---|---|
| 1,133,446 | Richter | Mar. 30, 1915 |
| 1,162,130 | Buchner | Nov. 30, 1915 |
| 1,570,353 | Jacobssen | Jan. 19, 1926 |
| 1,953,144 | Wilson | Apr. 3, 1934 |
| 2,088,281 | Smith | July 27, 1937 |
| 2,320,799 | Ruthruff | June 1, 1943 |
| 2,326,706 | Thomas et al. | Aug. 10, 1943 |
| 2,374,313 | Veltman | Apr. 24, 1945 |
| 2,402,668 | Roller | June 25, 1946 |

OTHER REFERENCES

"Acid Processes for the Extraction of Alumina," Bur. of Mines Bulletin 267, G. P. O. (1927), pages 48 and 49.